United States Patent
Dröll

[11] 3,927,842
[45] Dec. 23, 1975

[54] WIRE SUPPLY CONTROL ARRANGEMENT

[76] Inventor: Hans Dröll, An der Rosenhelle 4, 6369 Niederdorfelden, Germany

[22] Filed: Oct. 26, 1973

[21] Appl. No.: 410,027

[30] Foreign Application Priority Data
Oct. 28, 1972 Germany............................ 2253053

[52] U.S. Cl........... 242/1.1 R; 200/61.15; 242/7.12; 324/65 R
[51] Int. Cl.²..................G01R 27/14; B65H 63/08; H02K 15/085
[58] Field of Search............... 242/1.1 R, 7.02, 7.03, 242/7.12; 200/61.15; 318/674; 324/62, 65 R, 161

[56] References Cited
UNITED STATES PATENTS

| | | | |
|---|---|---|---|
| 2,899,141 | 8/1959 | Harmon et al..................... | 242/7.12 |
| 2,947,488 | 8/1960 | Trotta............................... | 242/7.12 |
| 3,282,037 | 11/1966 | Barnett et al................... | 324/161 X |
| 3,302,897 | 2/1967 | Gilbertson...................... | 242/7.12 |

*Primary Examiner*—Billy S. Taylor
*Attorney, Agent, or Firm*—Larson, Taylor and Hinds

[57] ABSTRACT

A control arrangement for the wire supply of a stator winding apparatus is provided which produces an indication of when the amount of wire remaining in the supply drops below a predetermined level. The control arrangement includes an actual value resistance detector which produces an output voltage in accordance with the resistance of the supply and hence the wire remaining in the supply coil. A theoretical resistance value reference generator stores a voltage corresponding to the predetermined level referred to above and a comparator compares this voltage with that produced by the detector. The output of the comparator is utilized by control circuit which terminates operation of the winding apparatus and/or drives a suitable indicator.

4 Claims, 1 Drawing Figure

U.S. Patent    Dec. 23, 1975    3,927,842
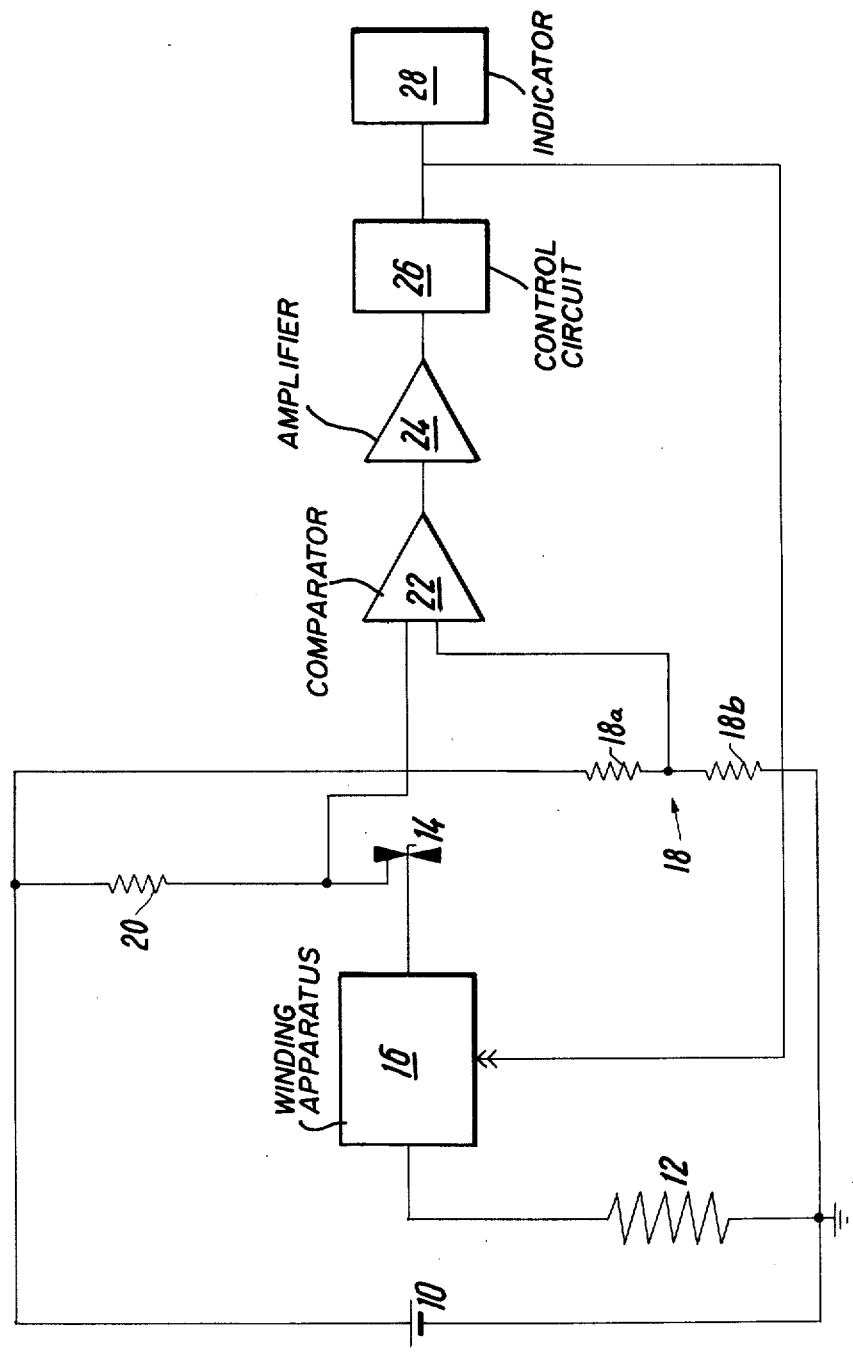

WIRE SUPPLY CONTROL ARRANGEMENT

FIELD OF THE INVENTION

The present invention relates to winding apparatus for the stators of dynamoelectric machines and, more particularly, to a wire supply control system for such apparatus.

BACKGROUND OF THE INVENTION

It is important from a number of standpoints to carefully control the wire supply for a stator winding apparatus. For example, even in situations where the wire supply is checked prior to operation, such as by means of an electrical instrument for detecting breaks in the wire, the possibility remains of the wire being subsequently damaged while the wire is being drawn off during the winding operation. It will be appreciated that it is a tedious and time consuming task to thread the wire through the various reversing rollers and nozzles up to the wire guide (e.g. a winding funnel), after the wire has been drawn off up to where the break has occurred. Further, if a break in the wire is noticed prior to the time the wire is drawn off up to the break and wound on to a stator, the wire can be mended or joined at the break and need not be threaded anew.

It is also quite important to know what length of wire remains on the supply coil being used so that a new supply coil can be ordered down and readied for use while the last stators are being wound. Further, by joining or tying up the trailing end of the old coil to the leading or forward end of a new coil during the transition between coils, the time consuming threading of the wire referred to above is avoided because the old coil will pull the leading end of the wire through the roller and nozzle arrangement.

SUMMARY OF THE INVENTION

In accordance with the present invention, a control arrangement is provided which enables efficient and effective monitoring and control of the winding supply for stator winding apparatus. The control arrangement includes a detector which is connected in a circuit completed through contacts at wire scissors which cut off the wire after the winding of each stator is completed, the detector sensing the actual or operating value of the resistance of the wire supply and producing a corresponding output signal. The circuit further comprises a reference circuit for generating a signal in accordance with a selected, predetermined resistance of the wire supply, a comparator for comparing the signals from the resistance detector and reference circuit, and a control circuit responsive to the output of the comparator which produces an output used to control the drive of the winding apparatus and/or a recording apparatus.

Since the above-mentioned circuit includes parts of the winding apparatus with which servicing personnel come into contact, low voltages are used and an amplifier is connected between the comparator and the control circuit.

The detector of the control arrangement of the invention will respond to a break in the conductor whereby the resistance of the wire supply markedly increases or to a condition wherein the amount of wire remaining in the wire supply drops below the predetermined value, i.e., where the actual value detected falls below the selected value stored by the reference circuit, the reference circuit preferably storing a plurality of different resistance values corresponding to different wire sizes and characteristics. The control arrangement of the invention thus makes it possible to terminate the operation of the winding apparatus in the event of a break or before the last stator to be wound from the supply is completed. Preferably, an indication is provided optically or acoustically that a residual amount of wire remains in the wire supply, for example, corresponding to that required to wind five or ten stators, so that during the time required for this quantity of stators to be wound, a new supply coil can be readied.

Because of the insulation provided on the wire, continuous measurement of the resistance of the wire is difficult. However, the wire is conventionally cut after each stator is wound and at the cutting device direct contact can be established with the forward end of the wire from the supply.

Other features and advantages of the invention will be set forth in or apparent from the detailed description of the preferred emmbodiment found hereinbelow.

BRIEF DESCRIPTION OF THE DRAWINGS

The single FIGURE in the drawings is a schematic circuit diagram of a winding supply control arrangement in accordance with the invention.

DESCRIPTION OF THE PREFERRED EMBODIMENTS

Referring to the single FIGURE in the drawing, a control arrangement is shown which includes a power source indicated at 10 and a wire supply which is indicated at 12. The circuit is completed through a contact 14 which is part of a wire cutting means of a winding apparatus denoted 16. More particularly, the wire supply 12 is connected into the circuit between the beginning end which is connected to the ground and the free end which is connected to the wire cutting means, the connection to the wire cutting means being indicated by contact 14 as noted above. The winding apparatus is preferably of the type wherein stator coils are prewound in patterns by winds of a winding funnel, i.e., a so-called "flyer", and are then drawn into the stator grooves. Winding apparatus of this type operate very rapidly and hence control of the wire supply is of particular importance.

After the winding of a stator by the winding apparatus 16, the wire is cut off and the electrical resistance of the wire supply 12 is measured by a wheatstone bridge arrangement including in one branch the wire supply 12 and a reference resistor 20 and in the other a unit 18 of two resistors 18a and 18b in series with a certain ratio of resistances, e.g. 1:1. The connections between resistors 12 and 20 and between resistors 18a and 18b are interconnected by a bridge including a comparator 22.

As noted, a number of different output voltages, provided by different valued reference resistors 20, are preferably available for selection in accordance with the size and characteristics of the wire actually being used.

The comparator 22 can be sort of a galvanometer. Because of the low voltages utilized to protect servicing personnel, an amplifier 24 is connected to the output of comparator 22. A control circuit 26 described hereinbelow is connected to the output of amplifier 24.

Apart from a situation where there is a break in the wire, which is taken into consideration particularly from the point of view of control engineering, the comparator 22 will not produce an output during normal operating conditions while the resistance, which is proportional to the length of the wire remaining in the supply, is greater than the resistance value of reference resistor 20. However, when the resistance drops below the predetermined theoretical value, comparator 22 produces an output signal which is applied to control circuit 26 which processes the signal for utilization. As indicated in the drawing, the output of control circuit 26 is connected back to winding apparatus 16 and can for example be used to switch off operation of the winding apparatus. Alternatively, or additionally, the output of control circuit 26 can be used to actuate a suitable recording or indicating device shown at 28. As stated hereinabove, a preliminary indication can also be provided when only enough wire remains in the supply to wind a selected number of stators, e.g., five or ten, so that the operator is alerted to the fact that a new winding coil should be readied.

Although the invention has been described relative to preferred embodiments thereof it will be understood by those skilled in the art that variations and modifications may be effected in these embodiments without departing from the scope and spirit of the invention.

I claim:

1. A wire supply control arrangement for a winding apparatus for stators of an electric machine wherein the wire from a wire supply is cut off each time after a stator is wound, said winding apparatus including a cutter device for cutting off said wire supply and said arrangement comprising an electrical circuit, connected to said cutter device and including the wire supply, for generating a first signal proportional to the resistance of the wire remaining in the wire supply, said circuit further comprising means for generating a second signal in accordance with a predetermined resistance value of the wire supply, comparator means for comparing said first and second signals and producing an output signal in accordance therewith, and utilization means connected to the output of said comparator means for utilizing said output signal.

2. A wire supply control arrangement as claimed in claim 1 wherein said utilization means comprises a control circuit for controlling operation of said winding apparatus.

3. A wire supply control arrangement as claimed in claim 1 wherein said utilization means comprises a control circuit which drives an indicator.

4. A wire supply control arrangement as claimed in claim 1 wherein said means for generating said first and second signals comprises a wheatstone bridge arrangement of resistors and said circuit is completed through contacts which open and close for each cutting operation.

* * * * *